Nov. 27, 1962  Z. LORENIAN  3,065,502
SCREW-TYPE EXTRUSION PRESS
Filed June 27, 1956  5 Sheets-Sheet 1
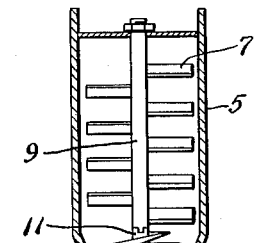
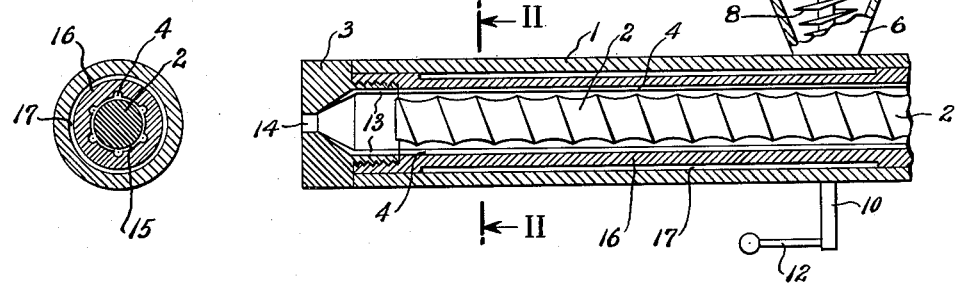
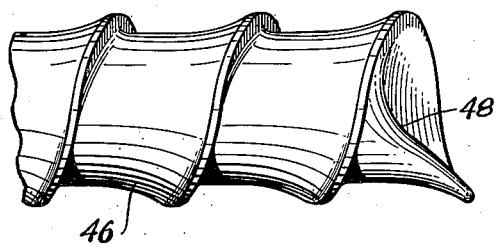
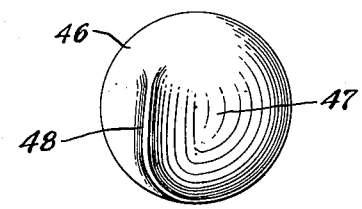

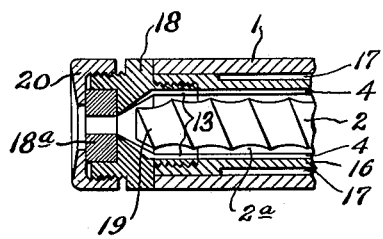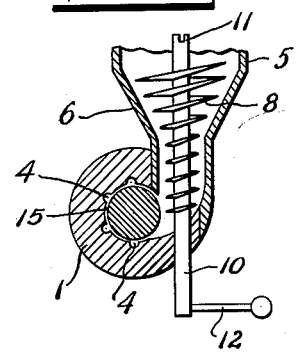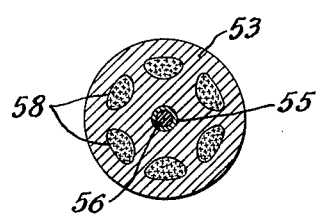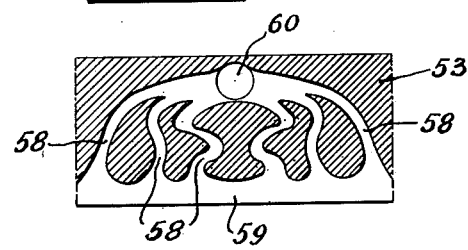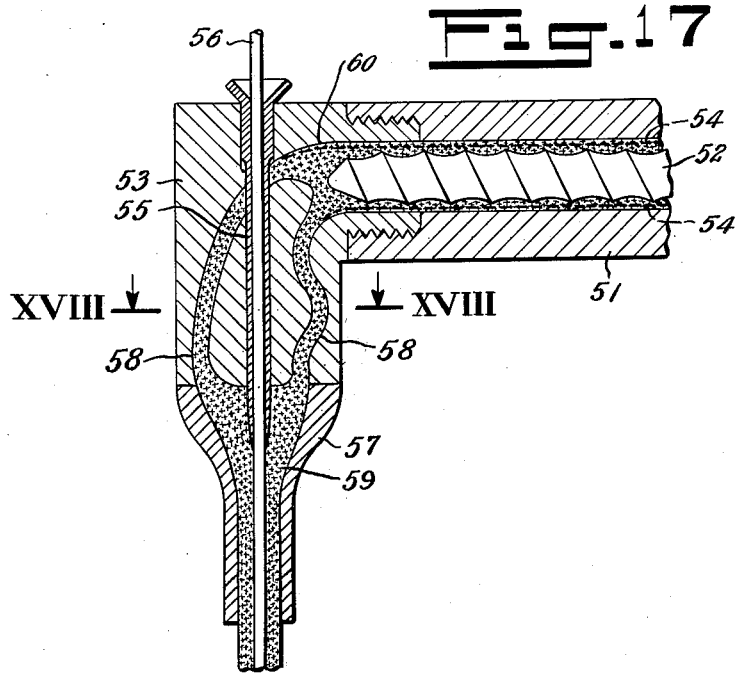

Nov. 27, 1962     Z. LORENIAN     3,065,502
SCREW-TYPE EXTRUSION PRESS
Filed June 27, 1956     5 Sheets-Sheet 3
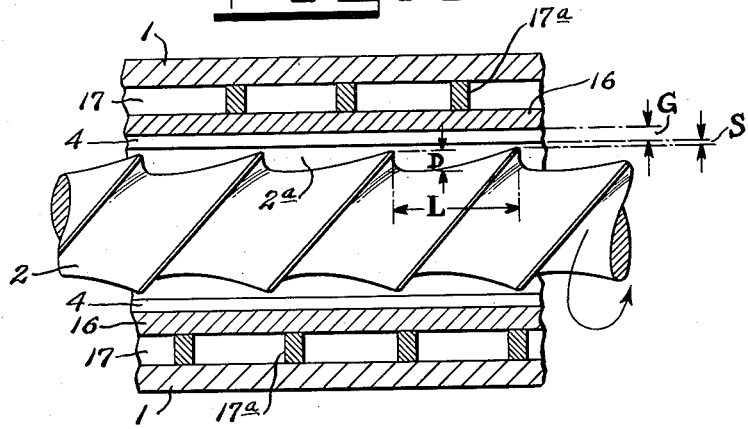
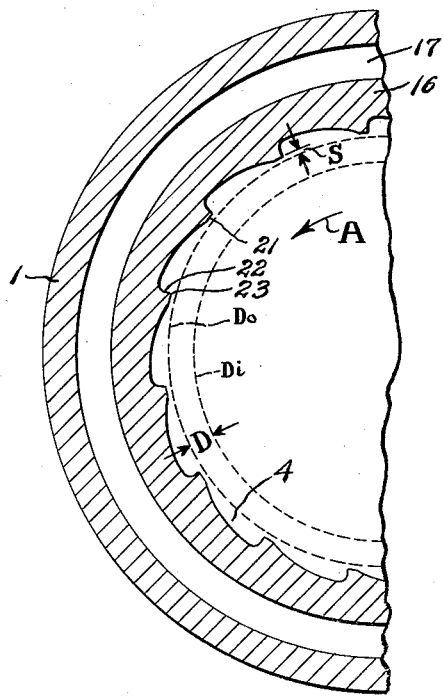
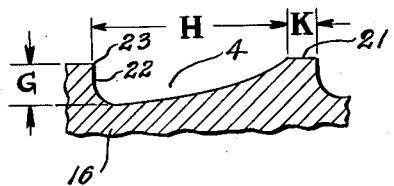
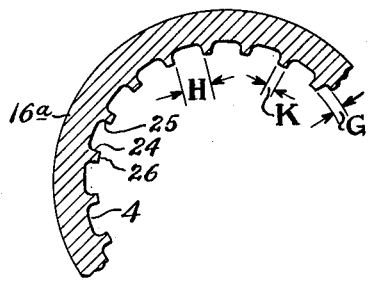

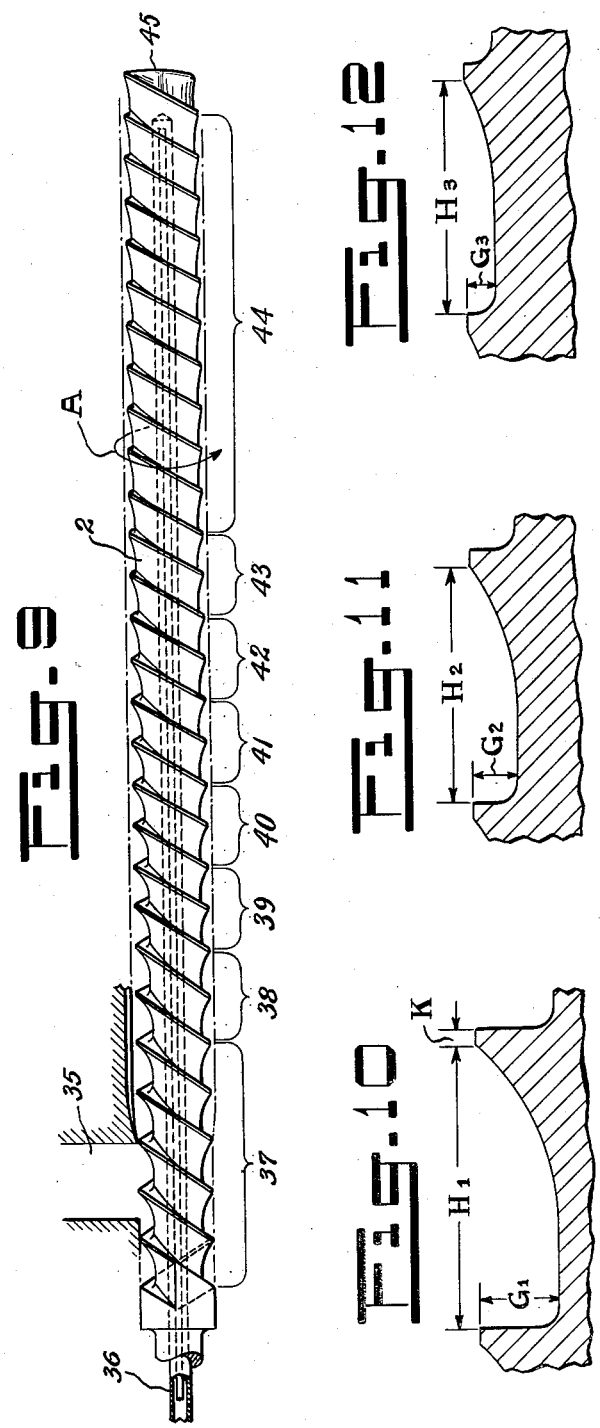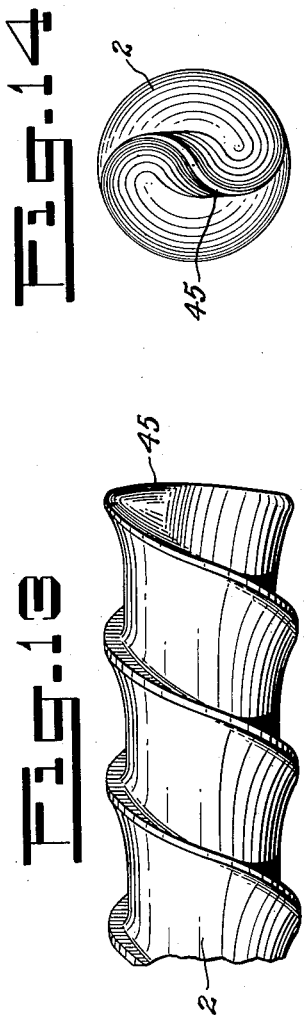

3,065,502
Patented Nov. 27, 1962

3,065,502
SCREW-TYPE EXTRUSION PRESS
Zareh Lorenian, Arnold Heise Strasse 17,
Hamburg, Germany
Filed June 27, 1956, Ser. No. 594,161
Claims priority, application Italy July 1, 1948
11 Claims. (Cl. 18—12)

My invention relates to screw presses for extrusion of plastic materials and is disclosed herein as a continuation-in-part of my copending application Serial No. 100,823, filed June 23, 1949, now Patent No. 2,769,201.

It is an object of my invention to provide an extrusion press, particularly suitable for extrusion of thermoplastic compositions, which operates not only with a better efficiency than the known screw presses but also results in products superior in quality to those made with the known presses.

In one of its more specific aspects, my invention aims at solving a problem peculiar to the extrusion of masses that contain readily carbonizable material together with a thermoplastic resin. The extrusion of such masses by the known screw extrusion presses has a rather low efficiency of extruding operation as well as an unsatisfactory large amount of defective or inferior products.

Certain materials, such as crude rubber, when heated to the proper extrusion temperature do not become sticky and do not adhere to the extrusion screw which therefore can be given rather deep threads. Such materials, as well as those extruded in the cold state, may remain in the screw press for any period of time without any deterioration as long as the temperature does not exceed the normal range. This, however, is not so with synthetic or natural thermoplastic resins and with compositions of comminuted wood, cellulose or other carbonizable material mixed with such resins. Thermoplastic resins, especially synthetic resins, when heated to the proper plasticizing temperature become tacky, some of them to a very pronounced degree, and tend to stick to the extrusion screw so that they may be churned around in the cylinder of the extrusion press. When thus delayed in the press, such thermoplastic resins and compositions containing them deteriorate in mechanical and other physical qualities. It is therefore desirable to plasticize such materials as rapidly as possible under heat and pressure, and to convey them, once plasticized, as quickly as possible through the extrusion press.

The tendency to deteriorate is aggravated if the thermoplastic resinous material to be extruded contains wood flour or other cellulosic material which begins to carbonize when kept unduly long at the plasticizing temperature of the resin component being, for instance, over 130°.

Such mixed materials are applicable, for instance, for the manufacture of extruded writing pencils whose sheath contains a major amount of wood flour and a minor amount of synthetic thermoplastic resin, and which is scissible when extruded. The dry and thermoplastic masses of this type, mixed and homogenized prior to being fed into the extrusion press become impaired by partial carbonization due to prolonged presence in the press.

It is known to provide the inner wall of the screw press cylinder with transverse or helical grooves. In some of these known devices, the transverse grooves, serving to improve cutting or masticating and comminuting operation, have the effect of impeding and retarding the passage of the material through the press. In another known device, equipped with helical grooves in the inner cylinder wall, the volume of the grooves is negligibly small in comparison with the total conveying volume of the screw press and the length of the grooves is limited to only part of the cylinder wall not including the material inlet zone nor the shaping nozzle or its immediate vicinity. From the viewpoint of the objects of my invention, all these known devices leave much to be desired and none of them is satisfactory for such aggravated conditions as encountered with the above-mentioned mixed compositions. It is therefore a more specific object of my invention to provide a screw extrusion press that eliminates such deficiencies and disadvantages.

An extrusion press equipped with a transverse nozzle head, called "cross head," for extruding a coating or sheath onto a pencil core, cable, rod or other core body, the abovementioned occurrence of defective or inferior products is also due to the fact that when the travelling speed of the extrusion material at one location within the cross head is just as desired, the speed may be different at other locations. Due to such diversity in flowing speed of the material delivered by the extrusion screw into the cross head, the various portions of the material from which the shaped article is formed do not emerge from the nozzle in uniformly coaxial or parallel relation to each other. It is, therefore, another specific object of the invention to provide a screw press which also obviates such deficiencies; and it is a further object to extrude sheets of thermoplastic material so that the material advances at uniform rate at all points across the entire width of the sheet.

To achieve the above-mentioned objects, a screw extrusion press according to my invention has a casing or cylinder which is straight, i.e. has constant cross section, either along the entire length of the press screw from the material inlet up to extrusion nozzle head or at least over an elongated portion of the length of the screw adjacent to the nozzle head. Furthermore, the press screw has shallow thread spaces at least over the length of said elongated portion. That is, the pitch of the screw must be a multiple of the depth of thread, the pitch to depth ratio being preferably more than 3:1 up to 8:1 or more. In such an extrusion press, I provide the inner wall of the casing along the press screw with straight longitudinal grooves peripherally spaced from each other and extending all the way through said straight casing or casing portion at least up to the end of the press screw but in any case up to the nozzle head. I further keep the smallest periphery of the inner casing wall spaced radially from the largest periphery of the press screw so that a peripheral gap is formed which provides a communication between the grooves of the casing wall and thus interconnects the material in the respective grooves with the material in the screw threads. The radial width of the peripheral gap, therefore, exceeds the conventional tolerance or clearance but this width is smaller than the depth of the grooves.

The interruptions formed by the longitudinal grooves in the casing wall cause the material adhering to the feed screw to be torn off so that clogging or sticking is avoided. The gap contributes to this effect, and the material is more rapidly plasticized and flows more rapidly and at better efficiency than in the extrusion presses heretofore available.

According to another feature of my invention, relating to extruders with a coaxial nozzle head at the delivery end of the screw casing, the nozzle head is likewise provided at its inner surface with grooves that correspond with the respective longitudinal grooves of the screw casing and form continuations thereof. The grooves in the nozzle head, however, stop short of the shaping nozzle opening or the shaping portion of the nozzle head or nozzle. The screw is preferably given such length that it terminates as near as possible to the nozzle head or projects into it.

The above-mentioned and other objects, advantages and features of my invention will be more fully understood by reference to the following detailed description in connection with the accompanying drawings, showing by way of example some embodiments of machines according to the invention. In the drawings:

FIG. 1 is a fragmentary vertical longitudinal section through a screw press, including a feeding device for the material.

FIG. 2 is a cross section along the line II—II in FIG. 1.

FIG. 3 is a vertical section through the lower part of the feeding device and of the press screw shown in FIG. 1.

FIG. 4 is a partial view, in longitudinal section, of a modification in which the press screw projects into the head of an extrusion nozzle head.

FIG. 5 is a vertical, longitudinal section through part of the screw press according to FIGS. 1 to 3, showing certain features of the invention more in detail.

FIG. 6 is a partial vertical cross section of the machine portion shown in FIG. 5.

FIG. 7 shows one of the grooves according to FIG. 6 more in detail on larger scale.

FIG. 8 is a cross-sectional view comparable with FIG. 6 but showing a modified shape of the longitudinal grooves.

FIG. 9 is a side view of the extrusion screw, and FIGS. 10, 11, 12 show sectional view of the screw thread at three different localities respectively of the same screw.

FIG. 13 is a partial side view, on a larger scale, of the forward end of the screw shown in FIG. 9 and FIG. 14 is a front view of the same end.

FIGS. 15 and 16 are similar side and front views respectively of the front end of a single-thread extrusion screw applicable in devices according to the invention instead of the double-thread screw shown in FIGS. 5 and 9 to 14.

FIG. 17 is a vertical, axial section through a screw press according to the invention with an extrusion nozzle of the cross-head type in which a number of passages all of substantially equal length and/or equal flow resistance are provided;

FIG. 18 is a cross section taken along the line denoted by XVIII—XVIII in FIG. 17 and FIG. 19 is an explanatory illustration representing a planar development of the passages that traverse the cross head according to FIGS. 17 and 18.

Figure 20:
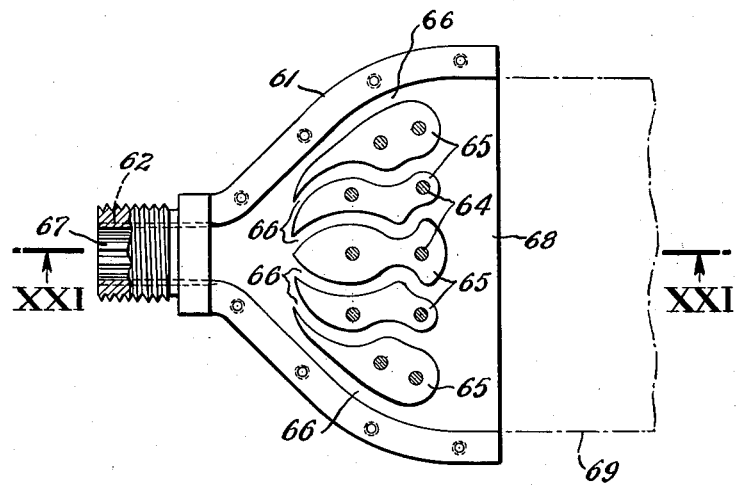
FIG. 20 shows a top view of an extrusion nozzle of the axial type but designed for the extrusion of flat sheet or strip material, the core portion of the nozzle being removed.

In the machine according to FIGS. 1 to 3, the press screw 2 is mounted for rotation in a cylindrical casing composed of an outer cylinder 1 and an inner cylinder 16. The nozzle head 3 is mounted on the exit end of the casing. The inner surface of the cylinder portion 16 is provided with straight grooves 4 which extend in the longitudinal direction of the press screw 2 up to the nozzle head. The material to be extruded is supplied into a feeding device 5 whose lower portion 6 is funnel-shaped and tapers toward the inlet opening of the press cylinder space. Centrally mounted in the feeding device 5 is a shaft 9 whose upper part carries mixing blades 7. A clutch 11 couples shaft 9 with a coaxial shaft 10 on which a feed screw 8 is mounted to convey and press the material from feeding device 5 into the press cylinder. The clutch 11 is controllable by means of a hand lever 12 which permits putting the feed screw 8 into and out of operation without requiring stopping of the press screw 2.

As explained above, the longitudinal grooves 4 must extend over most of the axial length of the press screw between the material inlet and the nozzle head 3 and up to the forward end of the screw and in any event up to the nozzle head. Thus in FIG. 1 the screw 2 is shown to extend along the entire active length of the feed screw up to, and somewhat into, the nozzle head 3. The grooves 4 are individually in registry with respective similar grooves 13 which extend axially in the inner wall of the nozzle head 3 so as to form respective continuations of the groove 4. The grooves 13 extend forward close to the outlet nozzle opening 14 but stop short of that opening so that the extruded body has the cylindrical or other shape exactly determined by the nozzle opening 14.

The inner diameter of the cylindrical casing portion 16 is diametrically spaced from the largest diameter of the press screw 2 so that a peripheral gap 15 (FIG. 2) is formed axially along the press screw and around the screw. This gap extends continuously over the entire length of the longitudinal grooves 4 and is much larger than the amount of tolerance conventionally applied. Consequently, the peripheral gap 15, as apparent from FIG. 2, has an appreciable volume so that the material in the gap interconnects the material located in the respective longitudinal grooves 4 and also connects that material with the material in the threads of the press screw 2 so that, under the pressure of the screw, a single coherent body of material is formed. This body, during press operation, advances as a whole so that sticking is securely prevented and the forwarding speed of the entire material kept at the obtainable maximum.

In the modification according to FIG. 4 the forward end 19 of the press screw 2 is extended into the nozzle head 18 which, in this case, carries a separable extrusion nozzle 18a mounted by means of a centrally apertured cover nut 20. The longitudinal grooves 4 in the modification of FIG. 4 are also continued by grooves 13 in nozzle head 18 which extend up to the entrance of the extrusion nozzle 18a and, as in the embodiment of FIG. 1, taper gradually from their normal depth to zero depth at the most forward point of each groove.

The space 17 between the concentric portions 1 and 16 of the cylindrical press casing serves to pass a heat-control fluid, for instance a heat-controlled liquid, axially and helically along the press housing for the purpose of imparting to the material the proper temperature. If desired, the space 17 may be subdivided by a helical insert as shown at 17a in FIG. 5 for passing the fluid helically around and along the press casing. Automatic temperature control for the heat control medium is preferably provided as it may become necessary not only to heat the material but also to reduce its temperature. This is so because the compression and/or friction occurring in the press screw may cause the material to become intensively heated even when no additional heat is supplied.

The design and volumetric proportion of the longitudinal grooves and the peripheral gap relative to the convolutions of the press screw are preferably adapted to the diameter of the screw and/or the characteristics of the material to be extruded and/or the working temperature of the extrusion process. An example suitable for the extrusion of thermoplastic compositions containing a major amount of comminuted wood or the like will be described presently with reference to FIGS. 5 to 7.

In order to prevent sticking of the material to the press screw and to also achieve the improved plasticizing efficiency and more rapid passage of the material through the screw press, the conveying spaces of the screw, such as the space denoted by 2a in FIG. 5, as well as the longitudinal grooves are all shallow along the length of the longitudinal grooves, and the volume of material contained during the operation in the longitudinal grooves and peripheral gap, though smaller than the volume of the conveying spaces of the screw, is preferably still in the same general order of magnitude per unit of axial length. The depth and volume of the grooves must be so chosen that the grooves are large enough for effectively detaching the material from the walls of the conveying spaces of the screw, but they must not be so large that the material in the conveying spaces is no longer able to forward the material located in the grooves. Thus there must be a certain relation or range of equilibrium between the shape and volume of the material contained in the grooves to the material contained in the conveying spaces of the screw.

These requirements are satisfactorily met if, as shown in FIG. 5, the helical pitch L, identical with the axial length of each conveying space 2a of the press screw, is a multiple of, namely more than three times than, the depth of thread D of the press screw as is apparent from FIG. 5. In FIG. 6, the circle corresponding to the inner diameter of the press screw is denoted by $Di$, the circle corresponding to the outer diameter of the screw is denoted by $Do$. The depth D of the screw conveying spaces is determined by the radial distance between these two circles. In the illustrated example (FIG. 5), the pitch L is more than five times the depth of thread D. Furthermore, it is preferable to vary the depth as well as the pitch-to-depth ratio progressively along the screw as will be explained below with reference to FIGS. 9 to 12.

Similarly, the peripheral width H of the longitudinal grooves 4, according to a preferred embodiment of the invention and as shown in FIGS. 6 and 7, is a multiple of the depth G of the grooves. The peripheral width H of the grooves is preferably such that the peripheral width K of the intermediate cylindrical portions or ribs 21 of the inner surface of cylinder 16 is smaller than the width H of the individual grooves 4. The radial thickness S of the peripheral gap between the largest diameter of the press screw 2 and the inner diameter of the cylinder 16 is shown exaggerated for the purpose of illustration; but this gap thickness S must be greater than the conventional tolerances. While, as a rule, such tolerances amount to some one hundredths of one millimeter or a few thousandths of one inch so that the gap volume is negligible in comparison with the total conveying volume of the screwpress cross section, the width S of the peripheral gap in a press screw according to the invention must contribute more than 1% of this conveying volume and must amount to 0.2 up to about 1.0 mm. In principle, the total volume of the gap must be large enough to interconnect the material in the respective grooves 4 and to also join the material in the grooves with the material in the screw threads but not so large that the back pressure acting from the nozzle or from the outlet of the nozzle head can appreciably affect the rapid passage of the body of material through the extrusion press.

As mentioned, the optimum ratio for each particular case between the volume of the longitudinal grooves and peripheral gap, on the one hand, and the volume of the conveying spaces between the threads of the press screw, on the other hand, depends somewhat on the particular operating conditions such as the particular material to be extruded and on the temperature best to be employed. I have found that for the just-mentioned reason the total volume of grooves and gap, best suitable for the purposes of my invention, may vary between about 20% and about 60%, and the volume of the screw conveying spaces between about 80% and approximately 40%. For example, a screw press according to the invention for the extrusion of a composition consisting predominantly of wood particles and containing a binder of thermoplastic synthetic resin and a slight addition of waxy substance, was found to operate satisfactorily with a volume of about 60% in the conveying spaces of the press screw, a volume of about 36% in the longitudinal grooves, and a volume of about 4% in the peripheral gap.

According to another feature of the invention, the cross section of the longitudinal grooves is preferably such that each groove has a steep side facing against the direction of screw rotation indicated by an arrow A in FIG. 6. Thus, the groove 4 as shown in FIGS. 6 and 7 has a steep side 22 which is directed radially with respect to the screw axis, and a gradually slanting side. The steep side 22 forms an edge 23 at the cylindrical surface portion 21. In the modification illustrated in FIG. 8 each longitudinal groove 4 in the cylindrical body 16 of the screw press casing has two steep sides 24 and 25 each of which forms a sharp edge with the remaining cylindrical portion 26 of the surface of body 16a. The peripheral width H of the grooves 4 according to FIG. 8 is a multiple of the depth of the grooves and also a multiple of the peripheral width K of the remaining cylindrical wall portions 26 that form ridges between the longitudinal grooves.

It has been mentioned above that it is preferable to vary the depth as well as the pitch-to-depth ratio of the thread spaces progressively along the press screw. This will be more fully understood from FIGS. 9 to 12 described presently.

FIG. 9 shows more realistically a double-threaded press screw applicable in the extrusion press according to the preceding illustrations. The press screw 2 is tubular and contains in its interior two concentric ducts at 36 for the supply of temperature-controlling fluid. The material inlet opening near the rear end of the feed screw is schematically indicated at 35. In FIG. 9, several consecutive portions of the axial length of the feed screw are denoted by 37 through 44.

The profiles of the screw-thread spaces within each individual portion may be alike, but the thread spaces vary from portion to portion in the manner apparent from a comparison of FIGS. 10, 11 and 12. FIG. 10 shows the sectional profile of each thread space in portion 37 of the press screw. The length of pitch $H_1$ and the depth of thread $G_1$ are as defined above with reference to FIGS. 5 to 7. It will be noted that in FIG. 10 the volume of the individual thread space is relatively large, the depth $G_1$ is also relatively large, and the pitch length $H_1$ is more than three times the depth $G_1$.

In the next following portion 38, the individual thread spaces have a somewhat smaller volume corresponding to the progressing compression of the material, and the depth of thread is somewhat smaller, whereas the ratio of pitch length to depth of thread is larger than in FIG. 10. In a similar manner, the volume decreases, the depth decreases and the pitch-to-depth ratio increases in each subsequent portion 39 to 44 of the press screw. Thus, FIG. 11 shows the sectional profile of an individual thread space in portion 41 of the screw. The depth $G_2$ is much smaller than the depth $G_1$ in FIG. 10, the pitch length $H_2$ is smaller than the corresponding length $H_1$ in FIG. 10, and the pitch-to-depth ratio $H_2:G_2$ is larger than in FIG. 10, the pitch $H_2$ being more than five times the depth $G_2$ in FIG. 11.

Similarly, the profile of the thread space illustrated in FIG. 12, corresponding to the elongated end portion 44 of the press screw, has a still smaller volume. The depth of thread $G_3$ is smaller than the corresponding depth $G_2$ in FIG. 11, the length of pitch $H_3$ is the same as the corresponding pitch length $H_2$, but this length is more than eight times the depth $G_3$.

It will be recognized that, while all thread spaces along the active portion of the illustrated press screw are shallow, these spaces become progressively shallower from the material inlet 35 toward the nozzle head. Since the grooves and the peripheral gap have constant volume along the screw, it will be recognized that in such a design the proportion of volume occupied by longitudinal grooves and peripheral gap increases toward the delivery end of the feed screw in comparison with the volume of the thread spaces.

According to further and more specific features of the invention, it is preferable to design the extrusion press in all other respects in such a manner that the rapid passage of a coherent body of material through the press is nowhere interfered with along the entire passage of this material from the press screw to the nozzle outlet. One of the features that, in this respect, deserves attention is the design of the delivery end of the press screw. In known extrusion presses there is the possibility that particles or pockets of material may remain stationary or may travel at insufficient speed just in front and near the center of the press screw because at this location there is no or only little forwarding action directly produced by the screw. For that reason, and as illustrated in FIGS. 13 and 14, the end of the press screw is given the design of a double scoop with a relatively sharp S-shaped front edge 45 and adjacent smoothly curved scoop faces so as to continuously forward the material off the front end of the screw.

The press screws so far described and particularly illustrated in FIGS. 5 and 9 have two helical threads. This, of course, is not essential to the invention as it is also possible to use press screws with a larger number of helical threads as well as single-thread screws. The design of the delivery end of the screw in each case is preferably in accordance with the principle explained with reference to FIGS. 13 and 14. For instance, FIGS. 15 and 16 show a single-thread press screw 46 so shaped at its front end that a smoothly curved scoop-shaped area is formed at 47 adjacent to a rounded and forwardly projecting delivering edge 48. With press screws of a design exemplified by FIGS. 13 to 16, the accumulation or temporary stalling of a pocket of material in front of the screw is prevented so that there is no danger of subjecting part of material to carbonization or other deterioration due to prolonged presence of material particles in the zone where the material is subjected to plasticizing heat. That is, the illustrated shape of the screw end has the effect of forwarding the material more rapidly and more uniformly toward or into the nozzle head and more readily overcomes any back pressure as may be imposed upon the material depending upon the particular shapes and dimensions of the nozzle and/or the interior of the nozzle head.

In the operation of screw presses according to my invention I have found the following to be a conspicuous criterion for the proper operation of these machines as regards efficacity of the longitudinal grooves and of the peripheral gap.

As a rule, after a screw-type extrusion press has been working for some time and is to be cleaned, the nozzle head or cross head is removed from the press cylinder and the material contained in the cylinder is ejected by operation of the press screw. Then, in the conventional screw presses, the plasticized material issues from the press screw cylinder in corkscrew fashion. That is, in the absence of the nozzle head, the plasticized material emerges from the press screw cylinder in helical shape and, as a rule, rotates in corkscrew fashion, the adjacent turns of the helix being either spaced from each other or interconnected only by a fin or membrane of not more than about paper thickness and insufficient strength to hold the turns solidly together.

In contrast, when the nozzle head is removed from a screw press according to the invention and the press screw is kept in operation, the plasticized material issues from the press in form of a completely straight, tubular and coherent body which has the combined profile of the longitudinal grooves and the peripheral gap and the screw threads. This shows that the material in the gap and in the grooves merges with the material in the inter-thread conveying spaces of the press screw and thus indicates that the material was torn off the screw threads and forwarded on a straight path. Thus, the fact that the straight longitudinal grooves effectively take the material off the screw threads and advance it axially and longitudinally is evidenced by the just mentioned observation.

While the embodiments described with reference to FIGS. 1 to 4 have an extrusion head coaxially aligned with the press screw, the invention is also applicable to advantage with a cross-type extrusion head or "cross head." A machine thus equipped is illustrated in FIGS. 17 to 19.

According to FIG. 17 the screw press portion of the machine is similar to that explained above with reference to FIGS. 1 to 14. That is, the cylindrical casing 51 of the press surrounds a press screw 52 with shallow conveying spaces as described. The inner surface of casing 51 is provided with straight longitudinal grooves 54 and a peripheral gap also as described. The longitudinal grooves 54 extend over the major portion of the press-screw length up to the cross head 53 or over the entire length of the press screw between the inlet opening for the supply of the thermoplastic material to be extruded and the cross head. The grooves 54 are continued into the adjacent portion of the cross head.

The nozzle head 53 comprises an inner tubular nozzle body 55 for the supply of a core 56 such as a marking-core medium for a pencil, a wire, rod, pipe, tube or a cylinder to be coated or sheathed by extrusion. The inlet opening 60 of the cross head communicates with the nozzle space 59 in front of the inner nozzle tube 55 through a number of channels 58. In the conventional cross heads the material coming from the press screw and passing to the nozzle head space along the inner and shorter curvature near the screw press of the connecting part, encounters less friction and travels at greater speed than the amount of material passing along the outer and longer curvature. As a result, the various portions of material that is being extruded around the core member, may have different ultimate consistencies and may have the tendency to depart from accurate coaxial and parallel relation to one another and make the coating eccentric in relation to the core of the coated or sheathed article.

In order to avoid the occurrence of such differences in flowing speed within the cross head as well as the resulting non-uniformities in thickness and consistency of the coated or sheathed product, the various channels 58 in the cross head 53 of the machine according to the invention are all given the same length, and preferably about the same flow resistance as is apparent from the schematic diagram in FIG. 19. The discharge openings of the channels 58 into the nozzle outlet portion 57 of the cross head are located concentrically to the central bore of the cross head before they open into a common cavity. It will be understood that in this manner the cross head is prevented from partly or wholly obviating the improved plasticizing and forwarding conditions afforded by the longitudinal grooves and the peripheral gap.

The particular design, shape and size of the extrusion nozzle or cross head or cross-head nozzle in apparatus according to the invention depends upon the dimensions, diameter or shape of the particular article to be produced. Thus, while the nozzle bore in the device illustrated in FIGS. 1 to 4 is of tapering shape, a flaring or other shape of the nozzle bore may be necessary for other uses of the extrusion press, the invention being applicable and affording the above-described advantages with nozzles of any shape. For instance, the design principles explained in the foregoing, including those relating to multiple-channel nozzles of the general type exemplified by the device of FIGS. 17 to 19, are shown in FIGS. 20 to 22 incorporated in an extrusion head for the manufacture of flat sheets or strips.

Figure 21:
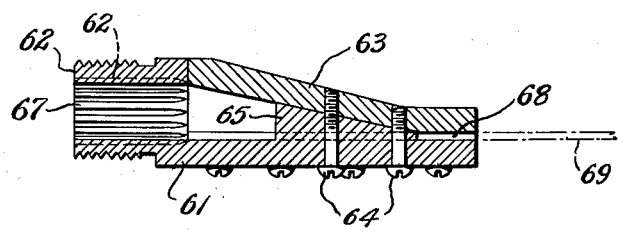
FIG. 21 is an axial cross section along the line XXI—XXI in FIG. 20.
Figure 22:
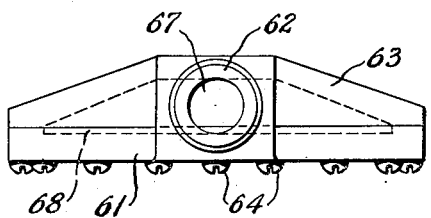
FIG. 22 is a view of the same device from the left of FIG. 20.

The extrusion head of FIGS. 20 to 22 has a bottom portion 61 integral with a screw nipple 62 to be mounted on the delivery end of the extrusion-screw casing. The top portion 63 of the nozzle head is firmly joined with the bottom portion 61 by screw bolts such as those denoted by 64. Mounted on the nozzle space between bottom portion 61 and top portion 63 are a number of mutually spaced bodies 65. These bodies may be formed as an integral part of the bottom portion 61 or they may be separately inserted and fastened to the bottom and top portion of the nozzle head by means of screws. The bodies 65 form a number of intermediate channels 66 which correspond in effect to the channels 58 described above with reference to FIGS. 17 to 19. That is, the channels 66 have all substantially the same length and preferably also the same flow resistance so that all partial flows of material passing from the inlet opening 67 through the respective channels 66 reach the outlet opening 68 of the nozzle simultaneously thus securing a parallel flow and a uniform speed of flow across the entire width of the flat sheet of material 69 emerging from the nozzle outlet.

As shown, the inlet portion 62 of the nozzle head illustrated in FIGS. 20 to 22 may be provided on its interior surface with a number of longitudinal grooves 60 which correspond to the longitudinal grooves in the interior surface of the press-screw casing and form continuations thereof as explained with reference to the preceding embodiments. The end of the screw may project into the inlet portion 62 of the nozzle head.

It will be apparent from FIGS. 17 to 22 that the increased rapidity and uniformity of extrusion afforded by the longitudinal grooves and the peripheral gap can be preserved all the way from the interior of the press-screw cylinder through the nozzle head even in cases where an irregular or flaring flow path must be provided between the forward end of the screw and the nozzle outlet.

It will be understood that, while in the illustrated embodiments the longitudinal grooves extend over the entire axial length of the feed screw from the material inlet up to the forward end of the feed screw and up to, or into, the nozzle head, it may also be sufficient to make the longitudinal grooves shorter so that they extend only over an elongated portion of the screw length adjacent to the forward end of the screw and up to, or into, the nozzle head. Some of the features of my invention, namely those relating to the feed-screw conveying spaces and those relating to the multi-passage nozzles exemplified by FIGS. 17 to 22, are also of advantage if used without the groove-and-gap features. It is also obvious, that my invention is not limited to single-screw extrusion presses but is also applicable with two or more press screws operating in parallel. Such and other modifications will be obvious to those skilled in the art upon a study of this disclosure, and it will therefore be understood that my invention may be embodied in devices other than those specifically illustrated and described, without departing from the essential features of my invention and within the scope of the claims annexed hereto.

I claim:

1. An extrusion screw press comprising in combination a stationary casing having an inner wall and a material inlet opening, pressure feeder means communicating with said inlet opening for supplying material under pressure into said casing, a nozzle head having a shaping nozzle forming the outlet of said casing, at least one rotatable press screw extending in said casing from said inlet opening to said nozzle head to convey and press the material through said casing, said casing having constant inner cross section at least along an elongated portion of its axial length adjacent to said nozzle head and having straight longitudinal grooves peripherally distributed in said inner wall and extending parallel to the casing axis along said entire elongated casing portion, said screw having along said entire casing portion a pitch which is a multiple of the depth of thread, the pitch-to-depth ratio being greater than 3:1 throughout said portion, said inner wall and the thread periphery of said screw being radially spaced from each other along the entire periphery and along said entire casing portion a distance greater than running-fit clearance but smaller than the depth of said grooves of said casing, and forming between said thread periphery and the smallest periphery of said inner wall a cylindrical gap space having a volume of more than one percent of the total conveying volume, whereby the material in the gap space interconnects the material in the grooves with the material in the conveying spaces of the screw so as to make the entire material advance as a single full-walled tubular body through said casing portion.

2. An extrusion screw press comprising, in combination, a stationary casing having a bore and an inlet opening, a pressure feeder device communicating with said opening for feeding material under pressure into said bore, a nozzle head having a shaping nozzle adjacent to said bore and forming the outlet of said casing, said bore having constant cross section substantially over its entire axial length between said inlet and said outlet and having a plurality of angularly spaced straight grooves extending longitudinally of said bore along said entire length at least up to said nozzle head, said screw having at least along a major portion of its axial length adjacent to said nozzle member a screw pitch which is a multiple of the depth of thread, said bore and the thread-top periphery of said screw forming together a continuous and uninterrupted peripheral gap space having a radial width greater than running-fit clearance but smaller than said depth, the gap space volume being more than one percent of the total conveying volume of said screw portion so as to form an appreciable duct path interconnecting the material in said respective grooves of said housing with the material in the conveying spaces of said screw, said grooves and said gap space having together a volume of about 20% to about 60% of the total conveying volume of said bore along said major portion of said screw.

3. An extrustion screw press comprising in combination a stationary casing having an inner wall and a material inlet opening, pressure feeder means communicating with said inlet opening for supplying material under pressure into said casing, a nozzle head having a shaping nozzle forming the outlet of said casing, at least one rotatable press screw extending in said casing from said inlet opening to said nozzle member to convey and press the material through said casing, said casing having constant inner cross section at least along an elongated portion of its axial length adjacent to said nozzle head and having straight longitudinal grooves peripherally distributed in said inner wall and extending parallel to the casing axis along said entire elongated casing portion, said screw having along said entire casing portion a pitch greater than three times the depth of thread so that the conveying spaces of the screw are all shallow throughout said portion, said inner wall and the thread-top periphery of said screw forming together a gap extending peripherally and axially around said screw, said gap extending uniformly about the entire periphery and having along said entire casing portion a width of at least 0.2 mm. up to about 1 mm. and a volume of more than one percent up to about four percent of the total conveying volume, and the combined volume of said grooves and said gap along said entire casing portion being about 20% to about 60% of the total conveying space, whereby the material in the thread spaces of the press screw and in the grooves and in the gap advances substantially as a single coherent, full-walled tubular body through said casing portion.

4. In a screw press according to claim 1, said grooves of said casing having in the peripheral direction of said inner wall a width greater than that of the intermediate wall portions of said inner wall, said width being larger than the radial depth of said grooves.

5. In a screw press according to claim 1, each of said grooves of said casing having a longitudinal flank extending substantially in a direction opposed to that of the screw rotation, said flanks forming respective longitudinal edges together with the portions of said inner wall intermediate said grooves.

6. In a screw press according to claim 1, said grooves of said casing having a peripheral width larger than that of the intermediate portions of said inner wall and having a shallow saw-tooth cross section, said cross section having a steep side and a slanting side, said steep side being substantially radial with respect to the axis of said screw and facing a direction opposed to the direction of rotation of said screw.

7. An extrusion screw press comprising in combination a stationary casing having an inner wall and a material inlet opening, a feeding device having a housing communicating with said casing through said inlet opening and having a drive shaft, a feed screw on said drive shaft adjacent to said inlet opening and mixer blades mounted on said shaft in said housing adjacent to said feed screw on the axial side of said screw away from said inlet opening for supplying material under pressure through said opening into said casing, a nozzle head forming the outlet of said casing, a rotatable press screw extending in said casing from said inlet opening to said nozzle head to convey and press the material through said casing, said casing having constant inner cross section at least along an elongated portion of its axial length adjacent to said nozzle head and having straight longitudinal grooves peripherally distributed in said inner wall and extending parallel to the casing axis along said entire elongated casing portion, said screw having along said entire casing portion a pitch which is a multiple of the depth of thread, the pitch-to-depth ratio being greater than 3:1 throughout said portion, said inner wall and the largest periphery of said screw being radially spaced from each other along the entire periphery and along said entire casing portion and forming together a peripheral gap interconnecting said grooves and of a radial width greater than running-fit clearance but smaller than the depth of said grooves, said gap having a volume of more than one percent of the total conveying volume, whereby the material in the gap interconnects the material in the grooves with the material in the conveying spaces of the screw so as to make the entire material advance as a single full-walled tubular body through said casing portion.

8. A screw extrusion press for manufacturing articles from compounds containing synthetic resins that are formable under heat and pressure, comprising a stationary casing having a bore, an inlet through which the work material may be fed into said bore, and an outlet, a conveying and press screw rotatably mounted in said bore, and a shaping nozzle adjoining said outlet to receive therefrom the material that is conveyed by said screw through said casing, said nozzle having a central bore through which an article that is to be coated with said work material is introduced, and a radial duct adjoining the outlet of said casing to receive therefrom the work material that is conveyed by said screw through said casing, and characterized by the fact that said nozzle is also provided with a plurality of longitudinal grooves forming passageways for said work material that communicate with said duct and that are of equal length and equal flow resistance and that are distributed around said central bore and that join and converge into a single duct concentric with said central bore at a point short of the mouth of said nozzle, the inside wall of the bore of said casing being provided with a plurality of angularly-spaced straight longitudinal grooves extending in the direction of the axis of said bore which grooves extend up to said shaping nozzle so as to prevent adherence of said work material to said screw.

9. An extrusion screw press comprising in combination a stationary casing having an inner wall and a material inlet opening, a nozzle head of the cross-head type having an inlet portion adjacent to said casing and a shaping nozzle whose axis extends at an angle to the axis of said inlet portion, a rotatable press screw extending in said casing from said inlet opening to said nozzle head to convey and press the material through said casing, said casing having constant inner cross section at least along an elongated portion of its axial length adjacent to said nozzle head and having straight longitudinal grooves peripherally distributed in said inner wall and extending parallel to the casing axis along said entire elongated casing portion, said screw having along said entire casing portion a pitch which is a multiple of the depth of thread, the pitch-to-depth ratio being greater than 3:1 throughout said portion, said inner wall and said screw being radially spaced from each other along the entire periphery and along said entire casing portion and forming together a peripheral gap interconnecting said grooves and of a radial width greater than running-fit clearance but smaller than the depth of said grooves, said gap having a volume of more than one percent of the total conveying volume, said nozzle head having separate channels of curve shape interconnecting said inlet portion and said nozzle, and said channels having all substantially the same length and similar friction relative to the flow of material therethrough.

10. An extrusion screw press comprising in combination a stationary casing having an inner wall and a material inlet opening, a nozzle head having a shaping nozzle forming the outlet of said casing, a rotatable press screw extending in said casing from said inlet opening to said nozzle head to convey and press the material through said casing, said casing having constant inner cross section at least along an elongated portion of its axial length adjacent to said nozzle head and having straight longitudinal grooves peripherally distributed in said inner wall and extending parallel to the casing axis along said entire elongated casing portion, said screw having along said entire casing portion a pitch which is a multiple of the depth of thread, the pitch-to-depth ratio being greater than 3:1 throughout said portion, said inner wall and said screw being radially spaced from each other along the entire periphery and along said entire casing portion and forming together a peripheral gap interconnecting said grooves and having a volume of more than one percent of the total conveying volume, and said press screw having a scoop-shaped forwarding end curving forward into said nozzle head.

11. An extrusion screw press comprising in combination a stationary casing having an inner wall and a material inlet opening, a nozzle head having a shaping nozzle forming the outlet of said casing, a rotatable press screw extending in said casing from said inlet opening to said nozzle head to convey and press the material through said casing, said casing having constant inner cross section at least along an elongated portion of its axial length adjacent to said nozzle head and having straight longitudinal grooves peripherally distributed in said inner wall and extending parallel to the casing axis along said entire elongated casing portion, said screw having along said entire casing portion a pitch which is a multiple of the depth of thread, the pitch-to-depth ratio being greater than 3:1 throughout said portion, said nozzle head being of the cross-head type and having an inlet nipple portion whose axis coincides with that of said casing and extends at an angle to the axis of said outlet, said nipple portion having longitudinal grooves aligned with, and forming extensions of, said respective grooves of said casing, said nozzle head having separate channels of curved shape interconnecting said inlet and outlet openings, and said channels having all substantially the same length and similar friction relative to the flow of material therethrough.

References Cited in the file of this patent

UNITED STATES PATENTS

| | | |
|---|---|---|
| 1,935,050 | Gordon | Nov. 14, 1933 |
| 2,369,359 | MacWilliam et al. | Feb. 13, 1945 |
| 2,370,469 | Johnson | Feb. 27, 1945 |
| 2,622,469 | Gray | Dec. 23, 1952 |
| 2,671,930 | Kessler et al. | Mar. 16, 1954 |
| 2,719,325 | Franklin | Oct. 4, 1955 |
| 2,763,896 | Vogt | Sept. 25, 1956 |
| 2,765,490 | Zona | Oct. 9, 1956 |
| 2,769,201 | Lorenian | Nov. 6, 1956 |
| 2,872,703 | Gambrill et al. | Feb. 10, 1959 |

FOREIGN PATENTS

| | | |
|---|---|---|
| 24,738 | Great Britain | July 27, 1911 |